United States Patent
Gostlin et al.

(10) Patent No.: US 12,368,826 B2
(45) Date of Patent: Jul. 22, 2025

(54) HEAD UP DISPLAY SYSTEM AND METHOD

(71) Applicant: VALID MANUFACTURING LTD., Salmon Arm (CA)

(72) Inventors: Richard Allan Gostlin, Bonnington (CA); Derek Lee Sandquist, Queens Bay (CA); Jack William Fenkhuber, Salmon Arm (CA)

(73) Assignee: VALID MANUFACTURING LTD., Salmon Arm (CA)

( * ) Notice: Subject to any disclaimer, the term of this patent is extended or adjusted under 35 U.S.C. 154(b) by 273 days.

(21) Appl. No.: 18/063,615

(22) Filed: Dec. 8, 2022

(65) Prior Publication Data

US 2023/0179747 A1 Jun. 8, 2023

Related U.S. Application Data

(60) Provisional application No. 63/287,421, filed on Dec. 8, 2021.

(30) Foreign Application Priority Data

Dec. 8, 2021 (CA) .............................. CA 3141256

(51) Int. Cl.
*B60K 35/23* (2024.01)
*B60K 35/60* (2024.01)
(Continued)

(52) U.S. Cl.
CPC .............. *H04N 9/31* (2013.01); *B60K 35/60* (2024.01); *G02B 1/041* (2013.01); *G02B 1/14* (2015.01);
(Continued)

(58) Field of Classification Search
CPC ................................ H04N 9/31; B60K 35/23
See application file for complete search history.

(56) References Cited

U.S. PATENT DOCUMENTS

| | | | |
|---|---|---|---|
| 10,578,872 B2 | 3/2020 | Ouderkirk et al. | |
| 11,119,315 B2 | 9/2021 | Hirata et al. | |
| 2017/0343807 A1* | 11/2017 | Anzai | G02B 27/144 |

FOREIGN PATENT DOCUMENTS

WO 2020068513 A1 4/2020

OTHER PUBLICATIONS

'3M Windshield Combiner Film with PVB', Preliminary Technical Data 2021—3M Science Applied to Life, (2021), 2 pages.
(Continued)

*Primary Examiner* — Michael H Hong

(57) ABSTRACT

A projector display system comprises a projector and a laminate glass panel comprising first and second glass layers and an assembly of interlayers sandwiched therebetween. The first glass layer is substantially parallel to the second glass layer and the assembly of interlayers includes a reflective polarizer film. The reflective polarizer film of the laminate glass panel has a predetermined range of incident angles defined by an upper limit and a lower limit, wherein when the image is projected onto the laminate glass panel at an incident angle within the predetermined range of incident angles, the reflective polarizer film is adapted to reflect a minimum threshold amount of a first polarized light component of the said image. The projector projects an image onto the laminate glass panel at a selected incident angle that is at least 30° less than the lower limit of the said predetermined range of incident angles.

22 Claims, 5 Drawing Sheets

(51) Int. Cl.
*G02B 1/04* (2006.01)
*G02B 1/14* (2015.01)
*G03B 21/20* (2006.01)
*H04N 9/31* (2006.01)

(52) U.S. Cl.
CPC .......... *G03B 21/2006* (2013.01); *B60K 35/23* (2024.01); *B60K 2360/334* (2024.01)

(56) References Cited

OTHER PUBLICATIONS

S. Pankratz, W. Diepholz, J. Vanderlofske, 'Investigating Human Perception of Head-Up Display Ghosting', Frontline Technology, Feb. 2021, pp. 30-35.

\* cited by examiner

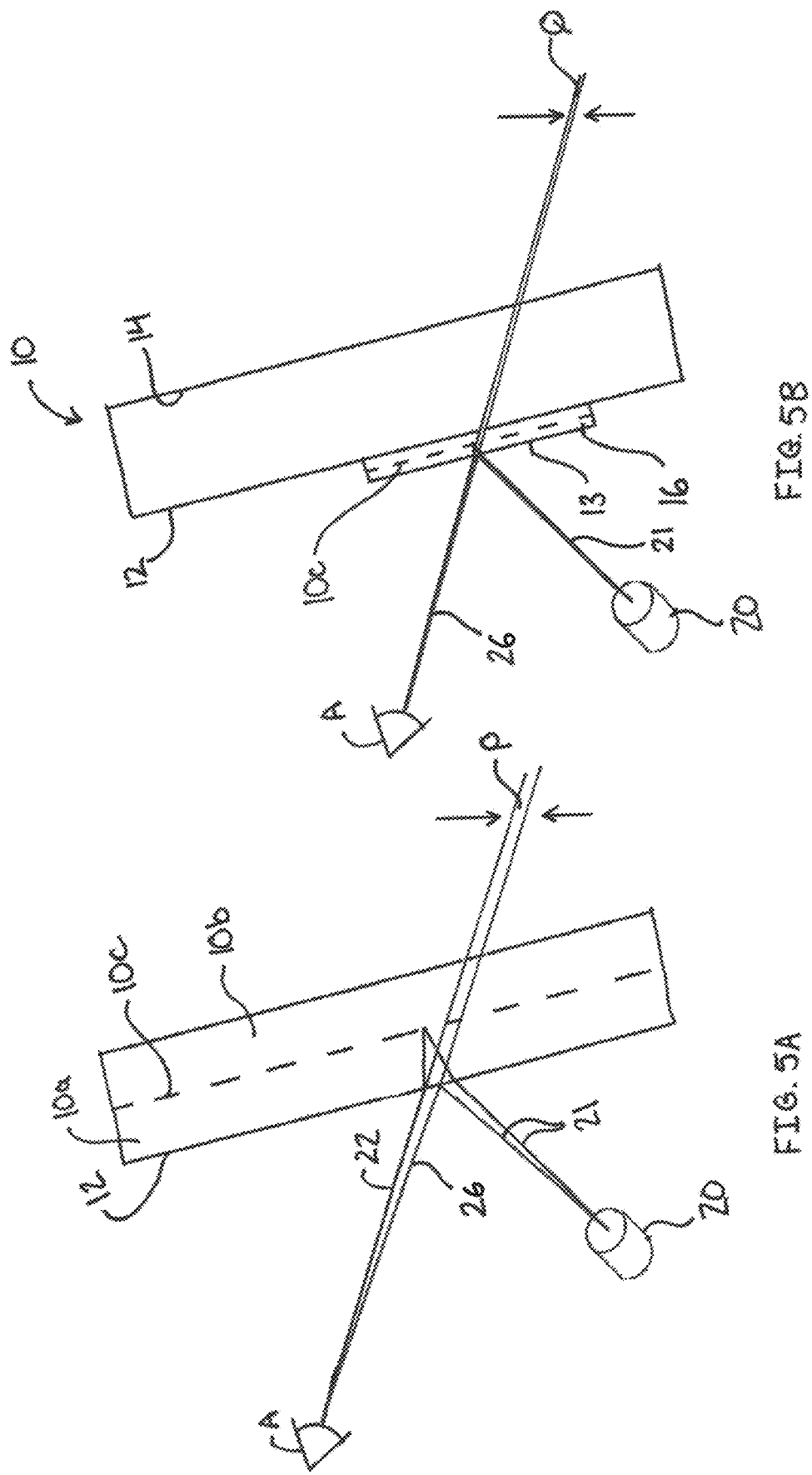

HEAD UP DISPLAY SYSTEM AND METHOD

FIELD

The present disclosure relates to systems and methods for projecting images onto glass; in particular, the present disclosure relates to methods and systems for providing head up displays in vehicles.

BACKGROUND

In consumer vehicles featuring a head up display, the head up display utilizes a wedge shape that is sandwiched into the windshield, to align the image reflected from the inner surface of the windshield with the image reflected from the outer surface of the windshield. The resulting laminate windshield is wedge shaped, wherein the opposite surfaces of the windshield are not parallel to one another. When the aligned reflected images reach the viewer's eye, they appear to be a single image with little or no "ghosting" effect. However, such wedge designs require high tolerances for the thickness profile of the windshield, particularly in the area of the windshield where the head up display wedge is located. To maintain such high tolerances, the windshields are manufactured in a mold and press, and are therefore typically more expensive to produce.

Furthermore, the alignment of the two reflected images in head up display windshields utilizing a wedge design, is dependent on the viewer's eyes being positioned at a particular height relative to the height of the image projected onto the windshield. Thus, if the viewer's line of sight is located higher or lower than the specified height for viewing the projected image of the head up display, the viewer may perceive two images that are misaligned from one another, thereby degrading the quality of the reflected image as perceived by the viewer.

Wedge head up display designs typically use s-polarized light for the image projected onto the head up display portion of the windshield. Light reflected from a glass surface becomes polarized with increasing angle of incidence. At angles above the Brewster angle for the glass surface, all light reflected from the glass surface is s-polarized, whereas the p-polarized light is refracted into the glass.

Recently, films have been developed which are designed to reflect a limited portion of polarized light from the surface of the film. Such films are designed to be incorporated into a laminated windshield, wherein the film is sandwiched between two layers of glass. An example of a reflective polarizer film is described in the Patent Cooperation Treaty application no. PCT/US2019/051733 by Vanderlofske et al. These films exploit the polarization properties of the Brewster angle to reduce or eliminate ghost images from the projected image viewed by the viewer. To use such films as specified by the manufacturer, the angle of incidence is required to fall within a predetermined range. Provided the angle of incidence falls within the predetermined range, depending on the refractive index of the glass layers used in the windshield, virtually all of the p-polarized light from a projector will be refracted into the glass of the windshield. As such, no image is reflected from the surface of the windshield, which is in opposed facing relation to the projector. The next surface interface encountered by the projected image is the film, which has a larger Brewster angle than the glass, and therefore the film surface reflects some of the p-polarized light, producing a reflected image that is visible to the viewer. Thus, such head up display windshields incorporating the film, when the image is projected within the predetermined range of incident angles, produces a reflected image with little or no ghost image that is visible to a viewer at different heights relative to the height of the projected image. Such head up display systems, described above, may be used in consumer vehicles, which typically have a windshield that is oriented at an angle of approximately 30° to 45° to the vertical.

SUMMARY

In one aspect of the present disclosure, a projector display system comprises a laminate glass panel having first and second glass layers sandwiching a reflective polarizer layer, or film, between the two glass layers. The reflective polarizer layer has a predetermined range of incident angles, the range defined by an upper limit and a lower limit, with the reflective polarizer layer having a minimum reflectance of a first polarized light component of, for example, approximately 25% when the angle of incidence of the image projected onto the laminate glass panel falls within the specified range predetermined by the film's manufacturer. A projector is positioned to project an image onto the laminate glass panel at an angle of incidence that is, for example, at least 30° less than the lower limit of the predetermined range of incident angles. The resulting image, reflected by the laminate glass panel, may include a faint ghost image or no perceived ghost image, depending on the thickness and refractive index of the first glass layer of the laminate glass panel that is facing the projector.

Surprisingly, the Applicant found that projecting an image onto the laminate glass panel, at an angle of incidence well outside the predetermined range specified for the reflective polarizer layer or film, still resulted in a clear reflected image with either a faint ghost image, or no ghost image detected. This finding enables the use of the laminate glass panel in a head up display system for use in vehicles having windshields that are vertical or nearly vertical, such as are found in buses or recreational vehicles. Because the reflectance of the p-polarized light by the reflective polarizer layer is reduced when the angle of incidence of the projected image is less than the lower limit of the predetermined range of incident angles, as compared to the reflectance of the reflective polarizer layer for incident angles that fall within the predetermined range, in some embodiments the system may include a brighter backlight for the projector. For example, the system may use a projector backlight between 5,000 and 10,000 lumens, whereas a typical head up display system may use a projector having a backlight between 1,000 and 2,000 lumens.

In some embodiments, to further reduce or eliminate the ghost image, the glass panel, which may include a laminate glass panel, may include a reflective polarizer layer or film applied to the surface of the glass panel facing the projector. Such embodiments may optionally include a thin protective layer of material laminated over the reflective polarizer layer, thereby reducing the distance between the external surface of the protective layer and the reflective polarizer layer, which thereby may reduce or eliminate the separation between a primary reflected image and a reflected ghost image.

In one aspect of the present disclosure, a projector display system comprises a laminate glass panel having first and second glass layers and an assembly of interlayers sandwiched between the first and second glass layers. An external surface of the first glass layer is substantially parallel to an external surface of the second glass layer, and the assembly of interlayers comprises a reflective polarizer film.

The system also includes a projector for projecting an image onto the laminate glass panel. The projector and the first glass layer of the laminate glass panel are in opposed facing relation to one another. The reflective polarizer film of the assembly of interlayers has a predetermined range of incident angles defined by an upper limit and a lower limit. When the image is projected onto the laminate glass panel at an incident angle falling within the predetermined range of incident angles, the reflective polarizer film reflects at least 25% of a first polarized light component of the image. However, the system may be configured such that an incident angle of the image projected onto the laminate glass panel is at least 30° less than the lower limit of the predetermined range of incident angles. In some embodiments, the projector comprises a backlight of at least 5,000 lumens. Furthermore, the laminate glass panel may be oriented at a tilt angle selected in a range between 0° and 15° from the vertical. The first polarized light component, in some embodiments, is a p-polarized light component of the projected image, and in some embodiments, the image projected by the projector is composed of p-polarized light. The second glass layer may have a thickness that is at least double the thickness of the first glass layer. In some embodiments, the selected incident angle of the image projected onto the laminate glass panel is at least 40° less than the lower limit of the predetermined range of incident angles.

In another aspect of the present disclosure, a method of projecting an image onto a substantially vertical laminate glass panel, using a system as described above, comprises the following steps: a) orienting the laminate glass panel at a tilt angle selected in a range between 0° and 15° from the vertical; b) positioning the projector for projecting the image onto the laminate glass panel, so that the projector and the first glass layer of the laminate glass panel are in opposed facing relation to one another, and a selected incident angle of the image projected onto the laminate glass panel is at least 30° less than the lower limit of the said predetermined range of incident angles. In some embodiments, a lens of the projector may be positioned at a distance of less than one meter from the first glass layer of the laminate glass panel. In some embodiments, the projector is housed within a dashboard of a vehicle and the laminate glass panel is a windshield of the vehicle. In some embodiments, the lens of the projector is positioned beneath an upper surface of the dashboard, and the image is reflected off a plurality of reflective surfaces within the dashboard and projected through an aperture in the upper surface of the dashboard. The aperture may be located at a distance of less than one meter from the external surface of the first glass layer of the laminate glass panel. The first polarized light component, in some embodiments, may be a p-polarized light component of the image. Furthermore, the image projected by the projector may be composed of p-polarized light.

In another aspect, the projector display system comprises a glass panel having first and second surfaces, the first and second surfaces being parallel to one another, and a reflective polarizer layer applied to a first surface of the glass panel. The system further includes a projector for projecting an image onto the glass panel, such that the projector and the reflective polarizer layer are in opposed facing relation to one another. The reflective polarizer layer has a predetermined range of incident angles defined by an upper limit and a lower limit, so that when the image is projected onto the glass panel at an incident angle within the predetermined range of incident angles, the reflective polarizer film reflects a minimum threshold amount of a first polarized light component of the image, and an incident angle of the image projected onto the glass panel is at least 30° less than the lower limit of the predetermined range of incident angles. In some embodiments, the glass panel is oriented at a tilt angle selected in a range between 0° and 15° from the vertical. The polarized light component may be a p-polarized light component of the image, and in some cases, the image projected by the projector is composed of p-polarized light. In some embodiments, the incident angle of the image projected onto the glass panel may be at least 40° less than the lower limit of the said predetermined range of incident angles. Furthermore, the glass panel may further include a protective layer, such that the reflective polarizer layer is sandwiched between the protective layer and the first surface of the glass panel. The protective layer may be manufactured of a material selected from the group comprising: glass, tempered glass, polycarbonate, plastic. In some cases, the protective layer may have a thickness of less than 0.5 mm.

BRIEF DESCRIPTION OF THE DRAWINGS

FIG. 5A is a schematic diagram of an embodiment of a head up display system of the present disclosure.

FIG. 5B is a schematic diagram of a further embodiment of a head up display system of the present disclosure.

DETAILED DESCRIPTION

Figure 1:
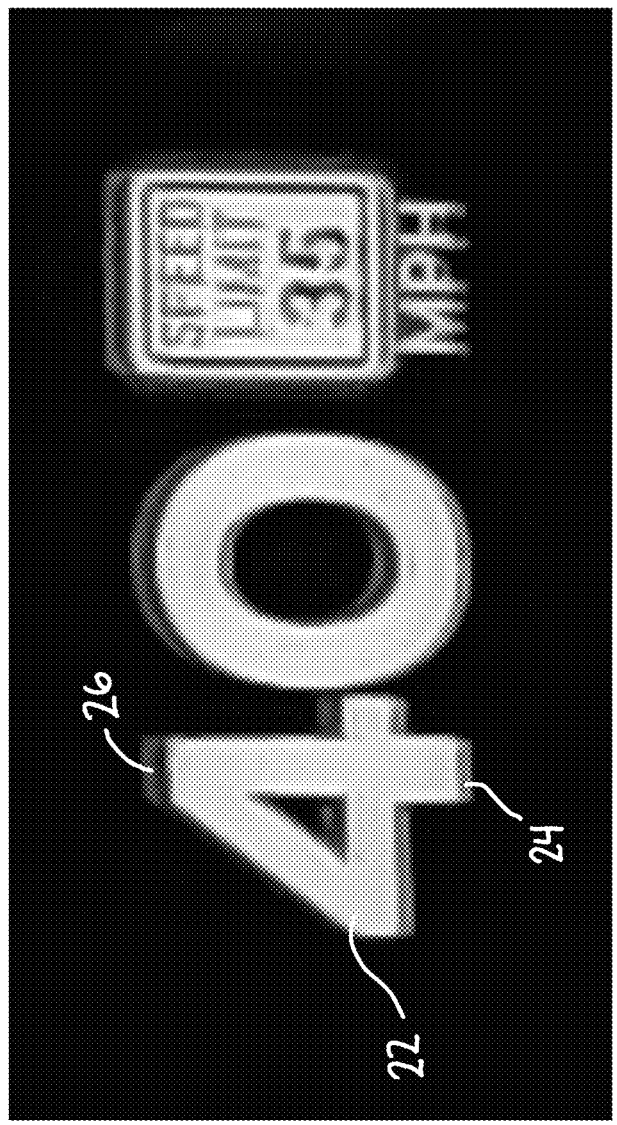
FIG. 1 is a photograph of an image projected onto a laminated glass panel in an example embodiment of the head up display system of the present disclosure.

It is desirable to incorporate a head up display in a larger vehicle, including but not limited to a recreational vehicle, a transport bus, agricultural equipment and heavy industrial equipment. However, such larger vehicles typically have windshields that are substantially vertically oriented, such that the windshield may tilt inwardly towards the driver's cabin at an angle of approximately 0° to 15° from the vertical. As discussed above, the wedge style of head up display windshields may be difficult and expensive to manufacture, and do not produce the same quality of projected images for users of the vehicle who may be positioned at different heights, relative to the height of the image projected onto the windshield.

The advancement of polarizer reflector films, which may be incorporated into laminated windshields, may reduce the expense and difficulty of manufacturing windshields for head up display systems. However, such films are designed to be used within a predetermined range of angles of incidence, as specified by the manufacturer of the film, to maximize the reflection of the polarized light by the film and to reduce any ghost images that are the result of the light reflecting from the surfaces of the first and second layers of glass that comprise the laminate windshield. Due to the cabin and dashboard configuration of the large vehicles that typically use vertical or near-vertical windshields, the Applicant has found it difficult to position the projector within the dash of the vehicle to bring the angle of incidence within the predetermined range specified for the polarizer reflector films.

The Applicant has discovered that, surprisingly, using much smaller angles of incidence that are less than the lower limit of the predetermined range of incident angles, may still provide a reflection of an image by the laminate windshield that is visible and clear. Due to the relatively smaller angle of incidence, a ghost image may also be visible, depending on the configuration; however, the Applicant has found that, in embodiments of systems that produce a ghost image, the ghost image may sufficiently overlap the primary image so that the ghost image does not significantly degrade or distract from the overall reflected image.

In some embodiments, the brightness of the projector's backlight may be substantially increased, as compared to projectors used in prior art head up displays. For example, without intending to be limiting, the Applicant may use a backlight ranging between 5,000 and 10,000 lumens, as compared to the 1,000 to 2,000 lumens that may be found in a typical prior art head up display. The Applicant has found that using a brighter projector backlight may compensate for the reduced amount of light that is reflected by the laminate windshield when using a smaller angle of incidence.

In some embodiments, rather than producing a windshield with the polarizer reflector film sandwiched between two layers of glass with approximately equivalent thicknesses, the windshield for the head up display may be produced by applying the film directly to one surface of either a laminate or non-laminate windshield, and a thin, optically transparent protective layer of glass or other suitable material may be laminated on top of the film to protect the film from damage. Such embodiments may desirably further reduce or eliminate the presence of a ghost image, by causing the faint ghost image reflected from the inner surface of the windshield to substantially overlap the primary image.

The head up display systems of the present disclosure will be further explained and illustrated, with reference to the following three examples of a head up display system. It will be appreciated that the three examples of head up display systems, below, are for illustrative purposes and are not intended to be limiting. Other head up display systems using different configurations of windshields and projectors, different types of reflective polarizing layers or films, equipment, different windshield construction and materials and/or other specifications, than described in the three examples below, are also intended to be included in the scope of the present disclosure.

Example 1

Figure 3:
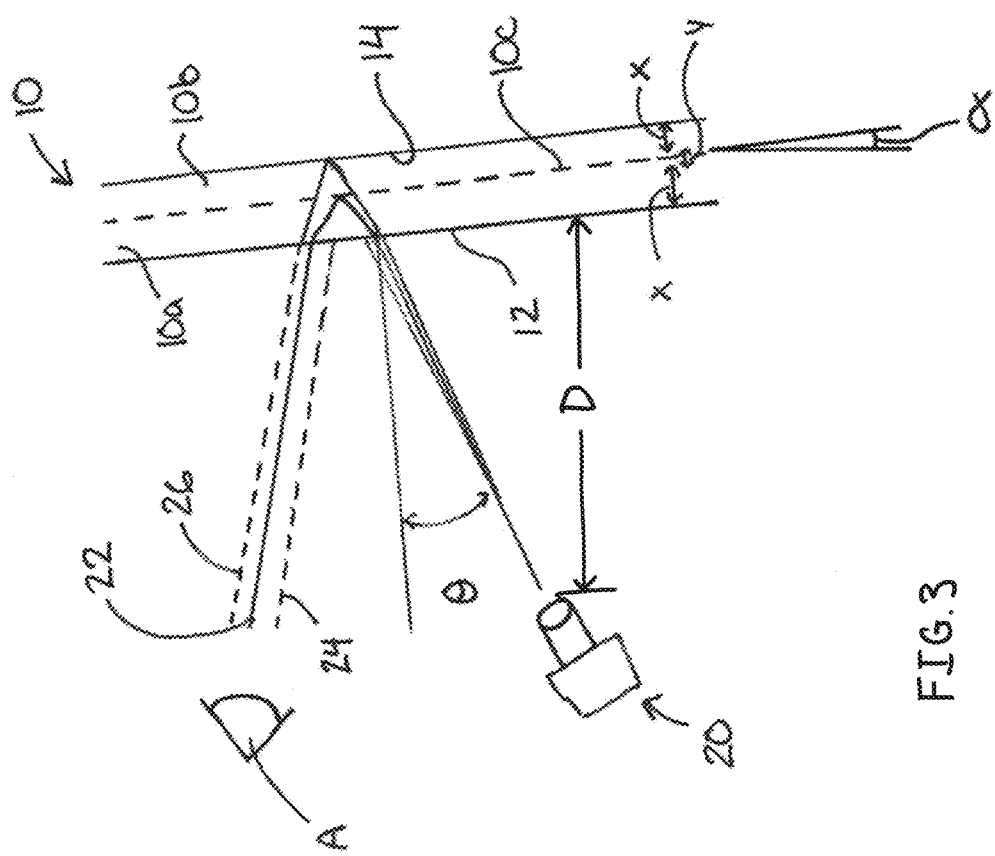
FIG. 3 is a schematic diagram of an embodiment of a head up display system of the present disclosure.

In one example of a head up display system, as illustrated in FIGS. 1, 3 and 5A, a laminate glass panel 10 comprises a first glass layer 10a, a second glass layer 10b and an assembly of interlayers 10c sandwiched between the first and second glass layers. The assembly of interlayers 10c, in this example, included a reflective polarizer layer that is incorporated into an interlayer film, described further below. As will be appreciated by a person skilled in the art, the assembly of interlayers in a typical laminate windshield for a vehicle may additionally include one or more protective interlayers, such as, for example, one or more polyvinyl butyral ("PVB") layers, for constructing a laminated glass panel that will hold together after breaking, also commonly referred to as "safety glass" in vehicle windshields. The assembly of interlayers may additionally include adhesive layers for bonding together the sandwiched assembly of layers.

Referring to FIG. 3, the first and second glass layers each had a thickness X of 1.6 mm, and a film thickness Y of 1.1 mm. The assembly of interlayers 10c, which includes the PVB protective interlayers and the adhesive for binding the film to each glass panel, was a Windshield Combiner PVB Film manufactured by 3M™ (technical data sheet located at: https://multimedia.3m.com/mws/media/2065153O/3m-windshield-combiner-film-with-pvb-3m-wcf-pvb-technical-data-sheet.pdf last accessed on Dec. 7, 2021). According to the technical data sheet, the film's manufacturer, 3M™, specifies the film is to be used at a target angle of incidence in a range, having a lower limit of 55° and an upper limit of 65°, and that the visible p-polarized light reflection at an angle of incidence of 60° has a minimum threshold amount of reflectance in the range of 25% to 33%. It will be appreciated that the above example is provided for illustration purposes only, and that other reflective polarizer films may be used in the assembly of interlayers 10c, and different thicknesses of the glass layers 10a, 10b may be used in the construction of a laminate glass panel and any such variations are intended to be included in the scope of the present disclosure.

As illustrated in FIG. 3, a projector 20 was positioned at a distance D of approximately 0.4 to 0.5 m between the projector and the surface of the glass panel 10, so as to project an image at an angle of incidence θ of approximately 15°. The glass panel 10 was oriented at an angle α of approximately 10° from the vertical. The primary reflected image, represented as line 22, is reflected by the reflective polarizer layer 10c and viewed by the viewer A. A first ghost image 26, reflected from the surface 12 of the first glass layer 10a, is faint compared to the primary image. A second ghost image 24, reflected from the surface 14 of the second glass layer 10b, may also be visible. However, the Applicant found that the first and second ghost images 26, 24 were relatively faint and aligned with, so as to substantially overlap, the primary image 22, given the type and thickness of glass used and the small angle of incidence. As shown in FIG. 1, which is a photograph of the projected image of the head up display system described herein in Example 1, the primary image 22 is shown, along with a first ghost image 26 and a second ghost image 24. As compared to the primary image 22, the first ghost image 26 is relatively faint and the second ghost image 24 is fainter compared to the first ghost image 26. Furthermore, as shown in FIG. 1, the ghost images 24, 26 substantially overlap the primary image 22, thereby having a minimal impact on the visibility and legibility of the primary image 22.

To produce the results shown in FIG. 1, the Applicant used a projector 20 having a backlight of approximately 10,000 lumens. The Applicant estimates that the reflectance of the film, when used at the selected angle of incidence of approximately 15°, may be in the range of approximately 10%, which is dimmer than the manufacturer's estimated reflectance of 25% to 33% when the angle of incidence is in the predetermined range of 55° to 65° specified for this film. As such, in some embodiments it may be desirable to use a brighter projector backlight, in the range of 5,000 to 10,000 lumens, as compared to a typical backlight used in head up display projectors, which may range from 1,000 to 2,000 lumens. The brighter backlight in the projector may compensate for the reduced reflectance of the p-polarized light at the reduced angle of incidence θ utilized in the head up display systems disclosed herein.

Figure 2:
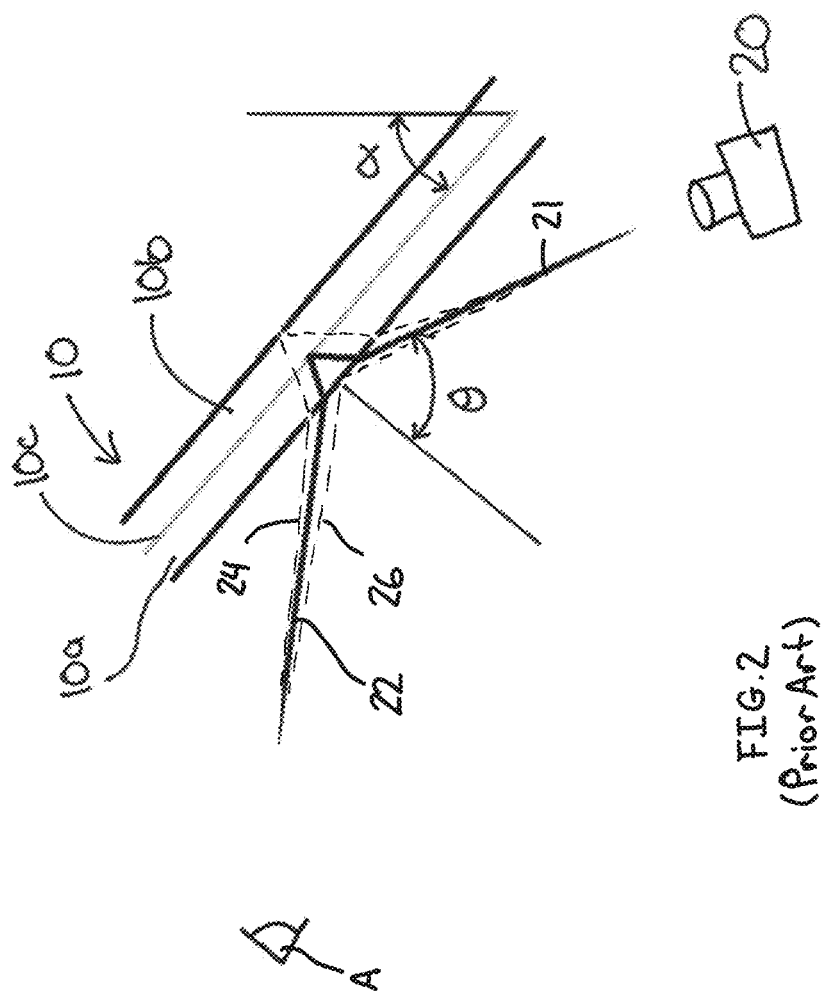
FIG. 2 is a schematic diagram of a prior art head up display system.

In contrast to the Example 1 head up display system described above, FIG. 2 illustrates a head up projector system configuration utilizing a laminate glass panel 10 constructed using first and second glass panels 10a, 10b, and the assembly of interlayers 10c is the same Windshield Combiner PVB Film manufactured by 3M™ that is described above. In this configuration, the angle of incidence θ is in the range of 55° to 65°, which is the predetermined range of angles of incidence determined by the film's manufacturer 3M™, and the windshield or glass panel 10 is oriented at an angle α of approximately 45°, as is typical of a consumer vehicle where conventional head up displays may be found. As mentioned above, the reflectance of the film, when used in the predetermined range of angles of incidence, is estimated to be between 25% to 33%. The Applicant notes that adjustments to the head up display system may be required for different configurations of laminate glass windshields. For example, some windshields may comprise first and second glass layers that each have a thickness X of approximately 3 mm, producing a windshield with an overall thickness of 7.1 mm. Because of the thicker glass panels, the first and second ghost images reflected by the respective surfaces of the first and second glass panels may be positioned further apart from the primary image reflected by the film. Adjustments to the system, therefore, may include repositioning the projector 20 at an angle of incidence of less than 15°. Other adjustments may include different configurations of the glass panel, such as having a first glass layer 10*a*, which is proximate the projector, having a smaller thickness X as compared to the second glass layer 10*b*. As an example, the first glass panel may have a thickness of 1.6 mm or less, and the second glass panel may have a thickness of 4 mm or greater.

Example 2

Figure 4:
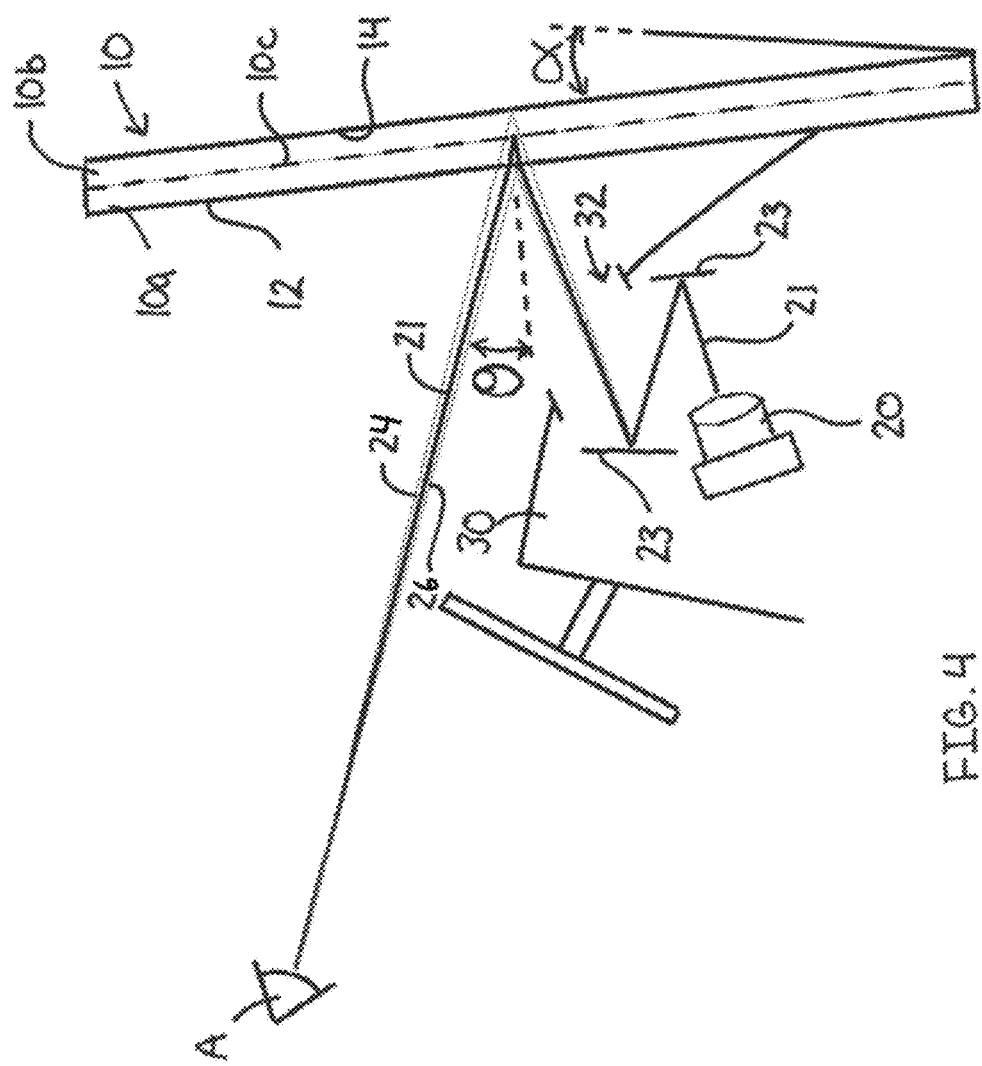
FIG. 4 is a schematic diagram of an embodiment of a head up display system of the present disclosure, showing details of the projector.

FIG. 4 is a schematic drawing of a projector display system of the present disclosure, wherein the projector assembly 20 is integrated into the dashboard 30 of the vehicle. To achieve the desired angle of incidence θ of the projected image 21 while enclosing the projector assembly 20 within the dashboard 30, a series of reflective surfaces 23 may be positioned within the dashboard housing to re-direct the projected image 21 through an aperture 32 in the dashboard 30. Similar to the Example 1 of a projector display system illustrated in FIG. 3, it may be appreciated that much of the projected image 21 is reflected off of the reflective polarizer film 10*c* to produce the primary image 22, while some of the projected image 21 is reflected off the surfaces 12, 14 of the first and second glass panels 10*a*, 10*b* to produce fainter, ghost images 24, 26. Whereas the Example 1 projector display system is configured without any specific limitations on where the projector assembly 20 is located within the vehicle, the Example 2 projector display system illustrates an example of how the projector assembly 20 may be incorporated within the dashboard 30 of the vehicle. Such configurations may be desirable because the projector assembly 20 is conveniently concealed within the dashboard.

Example 3

As shown in FIG. 5B, in some configurations the laminate panel may be constructed by applying a reflective polarizer film 10*c* directly to the outer surface 12 of the first glass layer 10*a*. In such configurations, the light from the projector does not pass through a glass panel before being reflected off of a reflective polarizer film 10*c*, thereby reducing or eliminating the reflection of ghost images 24, 26 from the surfaces of the first and second glass panels 10*a*, 10*b*. These configurations may optionally include a thin plastic or glass protective layer 16 that covers the exposed surface of the reflective polarizer film or layer 10*c*. In some embodiments, the protective layer 16 may be a thin (for example, less than 0.5 mm thick) layer of glass, tempered glass, polycarbonate, plastic, or any other suitable material for surface laminating the polarizing film to the external surface 12 of a finished windshield. Suitable materials, as would be known to a person skilled in the art, include materials that allow the projected image 21 to pass through the protective layer 16 with minimal absorption, meet the safety specifications for a windshield, and are sufficiently thin enough (for example, less than 0.5 mm thick) to reduce the distance between the primary image 22 reflected by the reflective polarizer film 10*c*, and a ghost image 26 that may be reflected from the surface 13 of the protective layer 16.

Referring to FIGS. 5A and 5B, schematic diagrams are provided to illustrate the relative distance between a primary image 22 and a first ghost image 26 reflected by a windshield 10. In these schematic diagrams, only the first ghost image 26 is shown while the second ghost image 24 is removed for clarity. Furthermore, the Applicant has observed that the second ghost image 24 may be much fainter than the first ghost image 26, because the first ghost image 26 is reflected from a surface 12 of the glass panel 10*a*, which surface is closer to the vantage point A of the observer as compared to the second ghost image 24 which is reflected from the surface 14 of the glass panel 10*b*. Because the light rays of the projected image 21 pass through more glass before being reflected by the surface 14 of glass panel 10*b*, more of the light of the projected image 21 may be absorbed or refracted into the glass than is reflected by surface 14, thereby producing a fainter second ghost image 24 as compared to the first ghost image 26.

FIG. 5A illustrates a projector display system that is similar to the systems described in Examples 1 and 2, above, in that the projected image 21 is projected onto a laminate windshield 10 consisting of first and second glass panels 10*a*, 10*b*, sandwiching a reflective polarizer film 10*c*. The projected image 21 is polarized by the reflective polarizer film 10*c*, and polarized light is reflected from the film to produce the primary image 22. Furthermore, the projected image 21 is also reflected off the exterior surface 12 of the windshield 10, producing a first ghost image 26 that is spaced apart from the primary image 22 by distance P.

In FIG. 5B, the reflective polarizer film 10*c* is applied directly to the external surface 12 of the windshield 10, and a thin protective layer 16 is laminated over the reflective polarizer film 10*c*. Advantageously, a reduced surface area of the windshield 10 may be covered with the reflective polarizer film 10*c*, covering only the area of the windshield 10 onto which the head up display is to be projected. As shown, the projected image 21 passes through the thin protective layer 16 and is then reflected off the reflective polarizer film 10*c* to produce the primary image 22. As well, the projected image 21 is reflected off the external surface 13 of the protective layer 16, to produce a first ghost image 26. As shown in the diagram, the primary image 22 and the first ghost image 26 are separated by a distance Q, and distance Q is much smaller than distance P between the primary and ghost images 22, 26 of the configuration shown in FIG. 5A. A smaller distance Q between the primary and ghost images 22, 26 means that there is increased overlap or alignment between the primary and ghost images 22, 26, resulting in a reduced ghost or shadow effect in the projected image of the head up display. Reducing or eliminating the distance Q between the primary and ghost images may produce a crisper, clearer projected image.

What is claimed is:

1. A projector display system, comprising:
a laminate glass panel comprising first and second glass layers and an assembly of interlayers sandwiched between the first and second glass layers, wherein an external surface of the first glass layer is substantially parallel to an external surface of the second glass layer, and the assembly of interlayers comprises a reflective polarizer film;
a projector for projecting an image onto the laminate glass panel, wherein the projector and the first glass layer of the laminate glass panel are in opposed facing relation to one another;
the reflective polarizer film of the assembly of interlayers having a predetermined range of incident angles defined by an upper limit and a lower limit, wherein when the said image is projected onto the laminate glass panel at an incident angle within the predetermined range of incident angles, the reflective polarizer film is adapted to reflect at least 25% of a first polarized light component of the image; and
wherein a selected incident angle of the image projected onto the laminate glass panel is at least 30° less than the lower limit of the predetermined range of incident angles.

2. The system of claim 1, wherein the projector comprises a backlight of at least 5,000 lumens.

3. The system of claim 1, wherein the laminate glass panel is oriented at a tilt angle selected in a range between 0° and 15° from the vertical.

4. The system of claim 1, wherein the first polarized light component is a p-polarized light component of the said image.

5. The system of claim 1, wherein the second glass layer has a thickness that is at least double the thickness of the first glass layer.

6. The system of claim 1, wherein the selected incident angle of the image projected onto the laminate glass panel is at least 40° less than the lower limit of the predetermined range of incident angles.

7. A method of projecting an image onto a substantially vertical laminate glass panel using the system of claim 1, the method comprising:
orienting the laminate glass panel at a tilt angle selected in a range between 0° and 15° from the vertical;
positioning the projector for projecting the image onto the laminate glass panel, wherein the projector and the first glass layer of the laminate glass panel are in opposed facing relation to one another, and wherein a selected incident angle of the image projected onto the laminate glass panel is at least 30° less than the lower limit of the said predetermined range of incident angles.

8. The system of claim 4, wherein the image projected by the projector is composed of p-polarized light.

9. The method of claim 7, wherein a lens of the projector is positioned at a distance of less than one meter from the first glass layer of the laminate glass panel.

10. The method of claim 7, wherein the projector comprises a backlight of at least 5,000 lumens.

11. The method of claim 7, wherein the projector is housed within a dashboard of a vehicle and wherein the laminate glass panel is a windshield of the vehicle.

12. The method of claim 7, wherein the first polarized light component is a p-polarized light component of the said image.

13. The method of claim 11, wherein a lens of the projector is positioned beneath an upper surface of the dashboard, and wherein the image is reflected off of a plurality of reflective surfaces within the dashboard and projected through an aperture in the upper surface of the dashboard, and wherein the aperture is located at a distance of less than one meter from the external surface of the first glass layer of the laminate glass panel.

14. The method of claim 12, wherein the image projected by the projector is composed of p-polarized light.

15. A projector display system, comprising:
a glass panel having first and second surfaces, the first and second surfaces being parallel to one another, and a reflective polarizer layer applied to a first surface of the glass panel;
a projector for projecting an image onto the glass panel, wherein the projector and the reflective polarizer layer are in opposed facing relation to one another;
the reflective polarizer layer having a predetermined range of incident angles defined by an upper limit and a lower limit, wherein when the said image is projected onto the glass panel at an incident angle within the predetermined range of incident angles, the reflective polarizer film is adapted to reflect a minimum threshold amount of a first polarized light component of the image; and
wherein a selected incident angle of the image projected onto the glass panel is at least 30° less than the lower limit of the predetermined range of incident angles.

16. The system of claim 15, wherein the glass panel is oriented at a tilt angle selected in a range between 0° and 15° from the vertical.

17. The system of claim 15, wherein the first polarized light component is a p-polarized light component of the said image.

18. The system of claim 15, wherein the selected incident angle of the image projected onto the glass panel is at least 40° less than the lower limit of the said predetermined range of incident angles.

19. The system of claim 15, wherein the glass panel further comprises a protective layer and the reflective polarizer layer is sandwiched between the protective layer and the first surface of the glass panel.

20. The system of claim 17, wherein the image projected by the projector is composed of p-polarized light.

21. The system of claim 19, wherein the protective layer is manufactured of a material selected from the group comprising: glass, tempered glass, polycarbonate, plastic.

22. The system of claim 19, wherein the protective layer has a thickness of less than 0.5 mm.

* * * * *